(12) United States Patent
Jennings

(10) Patent No.: US 8,333,186 B2
(45) Date of Patent: Dec. 18, 2012

(54) PARABOLIC TROUGH SOLAR REFLECTOR WITH AN INDEPENDENTLY SUPPORTED COLLECTOR TUBE

(76) Inventor: Kevin Jennings, Fairfield, CT (US)

(*) Notice: Subject to any disclaimer, the term of this patent is extended or adjusted under 35 U.S.C. 154(b) by 439 days.

(21) Appl. No.: 12/561,957

(22) Filed: Sep. 17, 2009

(65) Prior Publication Data
US 2010/0065045 A1 Mar. 18, 2010

Related U.S. Application Data

(60) Provisional application No. 61/097,937, filed on Sep. 18, 2008.

(51) Int. Cl.
*F24J 2/12* (2006.01)

(52) U.S. Cl. ........ 126/694; 126/680; 126/600; 126/569; 126/684; 126/607; 126/692; 29/457; 29/428; 52/146; 52/690

(58) Field of Classification Search .................. 126/694, 126/600, 569, 680, 684, 607, 692; 29/457, 29/428; 52/146, 690
See application file for complete search history.

(56) References Cited

U.S. PATENT DOCUMENTS

| | | | |
|---|---|---|---|
| 3,171,403 A | | 3/1965 | Drescher |
| 3,241,769 A | * | 3/1966 | Allen et al. .................. 239/736 |
| 3,672,572 A | * | 6/1972 | Delfs ............................ 239/731 |
| 3,745,601 A | * | 7/1973 | Appelt .......................... 14/77.3 |
| 3,985,119 A | | 10/1976 | Oakes, Jr. |
| 3,988,166 A | | 10/1976 | Beam |
| 4,078,549 A | * | 3/1978 | McKeen et al. ............... 126/606 |
| 4,120,285 A | * | 10/1978 | Nugent .......................... 126/653 |
| 4,148,301 A | | 4/1979 | Cluff |
| 4,159,629 A | | 7/1979 | Korr et al. |
| 4,214,572 A | | 7/1980 | Gonder |
| 4,249,515 A | | 2/1981 | Page |
| 4,297,003 A | | 10/1981 | Hutchison |
| 4,315,500 A | | 2/1982 | Gonder |
| 4,350,143 A | | 9/1982 | Laing et al. |
| 4,368,962 A | * | 1/1983 | Hultberg .......................... 353/3 |
| 4,515,148 A | * | 5/1985 | Boy-Marcotte et al. ....... 126/570 |
| 4,559,926 A | * | 12/1985 | Butler ............................ 126/578 |
| 5,445,177 A | | 8/1995 | Laing et al. |
| 5,462,047 A | | 10/1995 | Kleinwachter et al. |
| 5,794,611 A | * | 8/1998 | Bottum et al. ................ 126/661 |
| 2004/0055594 A1 | | 3/2004 | Hochberg |
| 2005/0028524 A1 | | 2/2005 | Laing et al. |
| 2008/0308094 A1 | * | 12/2008 | Johnston ........................ 126/694 |

FOREIGN PATENT DOCUMENTS

WO  WO 2007/087680  8/2007

* cited by examiner

*Primary Examiner* — Steven B McAllister
*Assistant Examiner* — Avinash Savani
(74) *Attorney, Agent, or Firm* — William J. Sapone; Coleman Sudol Sapone P.C.

(57) ABSTRACT

A parabolic trough solar collector system has a parabolic reflector used with an independently supported collector tube. The parabolic reflector has a reflective surface formed on a reflective surface support structure, supported by a circular support beam. This assembly rests on a plurality of support and drive rollers supported by a roller support arm, supported by a roller support column. The parabolic reflector assembly rotates against the rollers along a single axis to maintain a focus line of the parabolic reflector surface at the same location as the center of the circle described by the outer edge of the circular support beam. Located at this same focus line is the independently supported collector tube not attached to the parabolic trough reflector. The collector tube is supported on pipe roller hangers, which in turn are supported by a wire catenary system connected to support towers which straddle the parabolic reflector.

13 Claims, 4 Drawing Sheets

PARABOLIC TROUGH SOLAR REFLECTOR WITH AN INDEPENDENTLY SUPPORTED COLLECTOR TUBE

1. FIELD OF THE INVENTION

The present invention relates to a parabolic trough solar collector system. More particularly, the present invention is a parabolic trough solar reflector with a servo controlled focusing means that allows a collector tube to remain stationary relative to the parabolic trough solar reflector while the parabolic trough solar reflector rotates independently from the independently supported collector tube.

2. BACKGROUND

Parabolic trough solar collectors systems generally comprise a horizontally extending reflector having a parabolic cross section, the reflector directing radiation from the sun to a horizontal focus line where a tubular conduit known as a collector tube is located. The collector tube is filled with a heat transfer fluid which is heated by the reflected solar radiation. The parabolic surface acts as a concentrator for directing an optimum amount of energy to the collector tube. Such parabolic trough solar collector systems are currently being utilized with large scale electrical generation plants to concentrate sunlight onto collector tubes placed at the focus line of the parabolic trough. Existing systems use synthetic oil as a thermal transfer fluid circulating in the collector tubes. The oil is heated to approximately 400 degrees C. and then sent to heat exchangers to produce superheated steam. The superheated steam is then sent to a standard steam turbine generator where it is converted into electricity.

The cost to generate electricity using the existing parabolic trough systems remains much higher than the cost to produce electricity using existing conventional energy sources such as coal, natural gas and nuclear. These higher costs are partly due to the complexity of the existing parabolic trough support structure. These expensive structures include the trusses that support the parabolic reflector. These trusses are attached to a mechanical pivot which allows the assembly to slowly and smoothly follow the arc of the sun. The pivot is then attached to a foundation. Each component of this existing assembly needs to support the weight of the parabolic trough assembly while resisting structural and wind loadings. Existing parabolic troughs in operation today are limited in size due to the cost/benefit relationship of structure to the width of the parabolic reflector. The wider the trough, the more structure is required to support the reflective parabolic surface and to resist wind loads as well as requiring a larger pivot mechanism.

The weight of the collector tube connected to the trough adds to these structural loadings. Likewise having the collector tube attached to the parabolic trough makes it necessary for the collector tube to incorporate flexible and/or rotational joints to allow the tube to move as the system follows the focus line of the parabolic trough through the day's arc. Existing parabolic troughs require multiple joints to allow the collector tube to remain in the focus line of the parabolic reflector. These joints limit the operating temperatures and pressures of the collector tube, and provide a source for loss of thermodynamic efficiency, wear and possible leakage.

Existing parabolic trough systems used primarily for electric generation use synthetic oil as the thermal collection fluid running inside the collector tube. The oil is used partly due to the many flexible joints needed in the collector tube system. Synthetic oil is used in existing systems partly because it does not impose the high pressures that would be encountered should there be an attempt at producing superheated steam directly in the collector tube. The oil in existing systems is then sent to a heat transfer station where the thermal energy of the oil is converted into superheated steam. This heat transfer results in some loss of energy efficiency. Existing parabolic trough systems using synthetic oil are further limited by the maximum operating temperature of existing synthetic oil which currently is about 400 degrees C. Above 400 degrees C., existing synthetic oil's thermal stability degrades leading to lower heat transfer efficiency and an increased creation of degradation by-products. The 400 degree C. operating temperature limitation of the synthetic oil also represents the operating temperature limitation of the steam being sent to the turbines for the production of electricity. The optimum operation temperature for an electrical generating steam turbine is much higher than 400 degrees C. This operating temperature limitation imposed by the synthetic oil further reduces the efficiency of existing systems using synthetic oil. The combination of the width limitation on the parabolic trough and the operating limitations on the collector tube results in lower overall efficiencies and higher costs for existing parabolic trough solar collector systems.

3. SUMMARY OF THE INVENTION

Accordingly, an object of the present invention is to provide a parabolic trough solar collector system which overcomes the deficiencies of the existing systems.

Another object of the present invention is to provide a parabolic trough solar collector system with an independently supported collector tube.

Another object is to provide a parabolic trough solar collector which allows direct steam generation, avoiding the use of a heat transfer fluid.

These and other objects of the present invention are achieved by providing a simpler and lower cost version of a parabolic trough solar collector system, having a collector tube supported independently from the parabolic trough reflector. The collector tube remains stationary along the focus line relative to the movement of the reflector. Allowing the collector tube to be independently mounted and stationary enables the collector tube to be provided without the numerous flexible and/or rotational joints associated with existing systems. Additionally, removing these joints allows the tube to be made of a stronger material which enables the collector tube to contain fluids for operating at higher pressures and temperatures. Eliminating the flexible joints and allowing for the higher operating ranges of the stronger collector tube enable the present invention to generate superheated steam directly in the collector tube. This eliminates the secondary heat transfer systems associated with existing systems using synthetic oil as a thermal fluid. Consequently, the present invention makes generating electricity from solar thermal energy more affordable than existing parabolic trough systems.

4. BRIEF DESCRIPTION OF THE DRAWINGS

A fuller understanding of the nature and objects of the present invention will become apparent upon consideration of the following detailed description, taken in connection with the accompanying drawings, wherein.

6. DETAILED DESCRIPTION OF THE INVENTION

Figure 1:
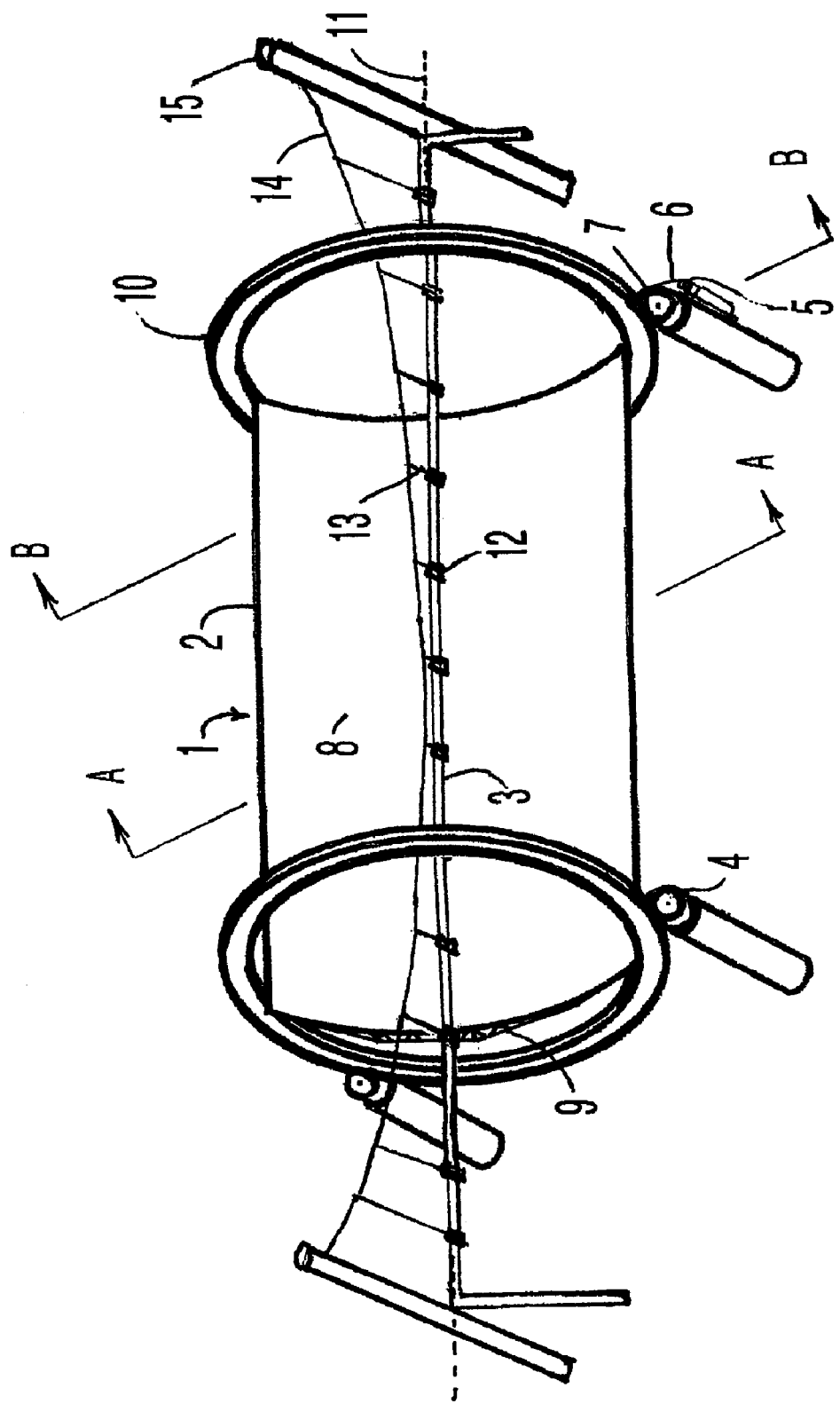
FIG. 1 is a perspective view of a parabolic solar collector trough system of the invention, illustrating the positions of the collector tube, a catenary support, a drive system and a servo controlled motor and focusing system for the trough reflector.

Referring to FIG. 1, a parabolic solar energy collector assembly 1 includes a parabolic reflector 2 which directs solar radiation to an independently supported collector tube 3. The parabolic reflector 2 rotates on support rollers 4 to track the travel of the sun, to optimize energy collection, and is driven by a drive system comprising a drive gear 5, engaged with a drive chain 6 connected to a drive roller 7. The parabolic reflector 2 is in the shape of a trough, and formed from a parabolic reflective surface 8 supported by a parabolic reflective surface support structure 9 supported by at least one circular support beam 10 which rides on the support rollers 4. In the embodiment of FIG. 1, two circular support beams are used though the number will depend on the length of the reflector, weight and other similar factors. Both the parabolic reflector 2 and the independent supported collector tube 3 are aligned along a generally North to South axis. The parabolic reflector 2 has a parabolic reflective surface 8 which reflects energy from the sun. The parabolic reflector 2 is able to track the sun by rotation of the circular support beam 10. The parabolic reflective surface 8 forms a focus line which is coincident with an axis 11 of the independently supported collector tube 3. The independently supported collector tube 3 is supported by a plurality of pipe roller hangers 12, each connected to a catenary suspender bar 13 in turn supported by a collector tube support catenary 14 which extends over the parabolic reflector 2, supported by a pair of catenary wire support towers 15.

The construction methods and materials used to construct the parabolic solar energy collector assembly 1 will depend on the size of the assembly to be built, and the size can vary substantially, from relatively small home units, measured by the length and width of the parabolic reflector 2 in inches, to larger commercial sized units measured in feet, to industrial sized units for large "energy farms", that can be many yards in length and width.

Figure 2:
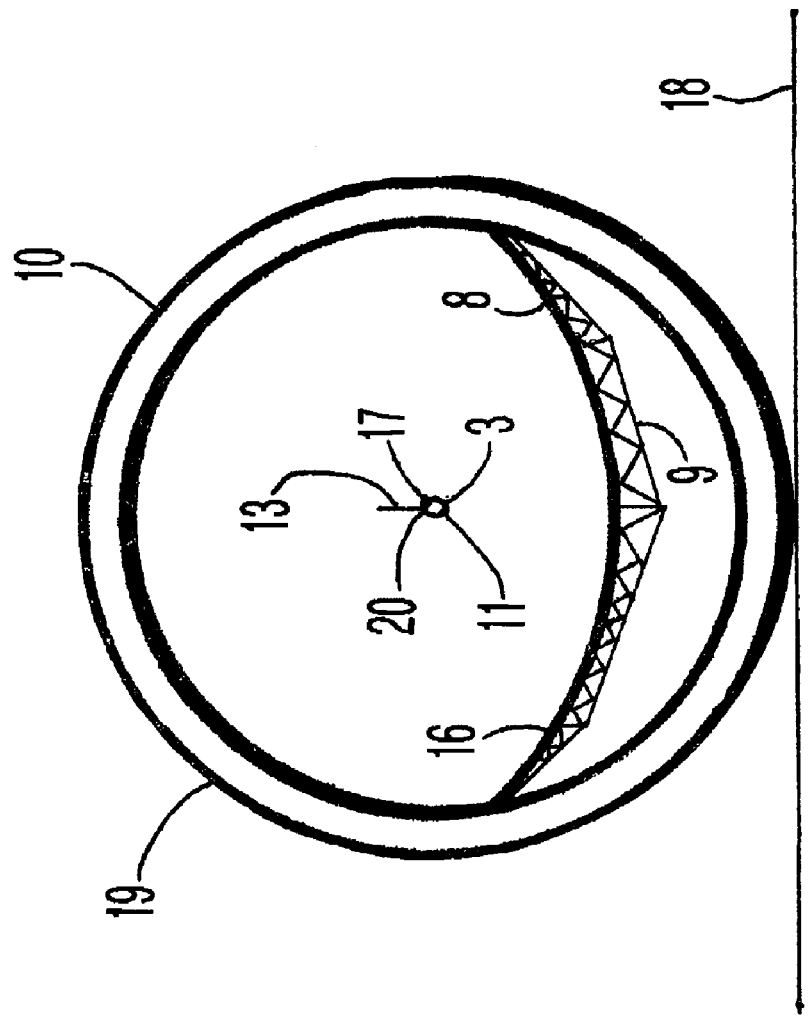
FIG. 2 is a cross-sectional view taken along line A-A of FIG. 1.

The preferred embodiment of the invention shown in the drawings is adaptable for use with a parabolic reflector 2 that can be very wide and have a fairly long trough, typically being about 15 ft. wide by about 30 ft. long, though larger or smaller sizes are also possible. The parabolic reflector 2 shown could allow the assembly to be manufactured out of steel, aluminum, wood, or plastic composite materials, such as fiberglass. The parabolic reflective surface 8 could be made out of panels of a reflective glass, aluminum, stainless steel, metal foil, or by use of a reflective coating applied to the surface. The circular support beam 10 could be made out of steel, aluminum, wood, plastic composite materials such as fiberglass or other materials capable of supporting the structural loads. The independently supported collector tube 3 could be made out of high strength carbon steel with a high solar absorption coating, though of course, other materials may be used such as various alloy steels, etc, depending on the operating parameters of the collector assembly, and choice of fluid (i.e. water, steam, or another heat transfer fluid, such as synthetic oil, etc.). The collector tube support catenary 14 and the catenary suspender bar 13 may be made out of many materials, but is preferably provided as a stainless steel cable, strung between the support towers 15. The support towers 15 may be made out of steel, aluminum, wood, plastic composite materials such as fiberglass or other materials capable of supporting the structural loads FIG. 2 represents a cross section taken along the line A-A in FIG. 1. This shows a preferred relationship between the circular support beam 10 and the parabolic reflective surface 8. One of the definitions of a parabola is that a parabola is the locus of points in a plane 16, which are equidistant from a given point, the focus 17 and a given line, the directrix 18. FIG. 2 also shows the parabolic reflective surface support structure 9 which attaches the parabolic reflective surface 8 to the circular support beam 10. In this embodiment, the circular support beam 10 extends for 360 degrees of arc. A circle 19 is described by the outer edge of the circular support beam 10. Using a circular support beam instead of a partial arch beam increases stability and provides additional strength to the assembly. A center 20 of the circle 19 is coincident with the focus 17 of the parabolic reflective surface 8. The independently supported collector tube 3 is supported by catenary suspender bars 13 along the axis 11 of the focus 17, which is also the center 20 of the circle 19.

Figure 3:
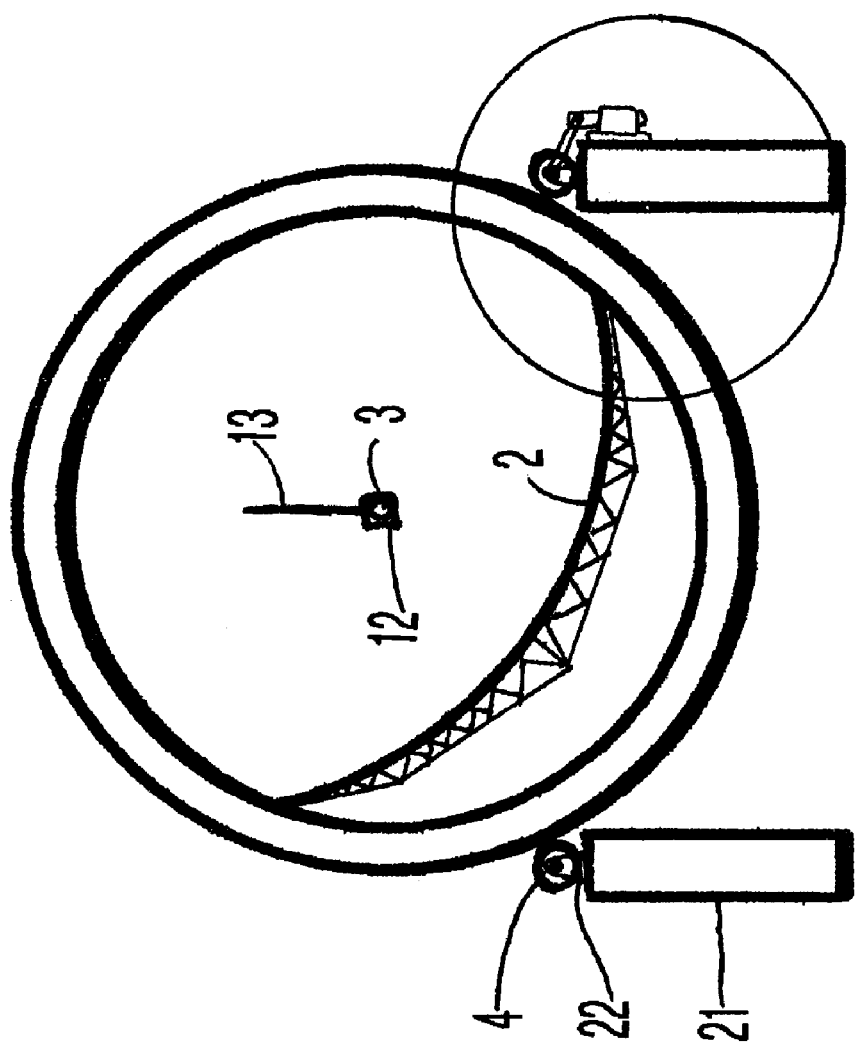
FIG. 3 is a cross-sectional view along line B-B of FIG. 1.

FIG. 3 represents a cross section taken along the line B-B in FIG. 1. In this preferred embodiment, each of the support rollers 4 are supported by a roller support column 21. For large scale systems, the roller support column 21 could consist of poured in place concrete supported by soil with embedded roller support arms 22 for the support rollers 4 to attach to. Smaller scale systems could have the roller support column made out of steel, aluminum, wood or a plastic composite material such as fiberglass for attachment to a building roof structure. In this preferred embodiment, the independently supported collector tube 3 is shown supported by a pipe roller hanger 12, which in turn is supported by a catenary suspender bar 13.

Constructing the assembly according to the present invention allows the independently supported collector tube 3 to remain stationary relative to the motion of the parabolic reflector 2. The independently supported collector tube 3 may move slightly along the north south axis due to expansion and contraction as it heats up and cools down, but this can be accommodated at the catenary wire support tower locations or in mid pipe, using suitable expansion joints, or piping loops could be constructed in the area between adjacent reflector assemblies, so that the expansion is accommodated at the ends, rather than mid-reflector. With operating temperatures that may range over 400 degrees C., this expansion and contraction can be significant. The use of pipe roller hangers 12 allows the independently supported collector tube 3 to expand and contract as needed. A further benefit of having the independently supported collector tube 3 is that the rate of expansion and contraction of the collector tube 3 can be independent of the expansion and contraction of the parabolic trough 2, which, even with the highly reflective surface, can heat up to a certain extent, though the reflector is primarily subjected to changes within the ambient temperature range for the locality where the assembly is put into service. In any event, an advantage of the present invention is that each system can move independent of the other.

A further benefit is that having a stationary independently supported collector tube 3 reduces significantly the number of flexible joints required in the existing systems, eliminating any rotational joints, reducing cost. Such an independent suspension system allows for the use of higher strength pipe materials, which enables the inventive system to operate at higher operating temperatures and pressures. Higher temperatures and pressures improve the thermal efficiency of the inventive system. For example, the system can operate with water as the heat transfer fluid, maintained as a liquid under pressure at high temperatures, i.e., operate at 400 psi, water having a boiling point at that pressure of about 230 degrees C. Existing parabolic reflector systems have collector tubes which use oil as the heat transfer medium, the oil heated by the solar radiation then pumped to a secondary heat transfer system for generating superheated steam. Such a heat transfer system is necessary in the existing systems because creating steam directly in the collector tube cannot be accommodated without the use of costly steam ball joints to accommodate the rotation of the collector pipe. Water under pressure, on the other hand can be flashed to produce steam which then can directly drive a turbine or be fed to a subsequent reflector for superheating.

Another benefit is that use of the circular beam support allows the parabolic reflector 2 to rotate completely around a 360 degree arc. This allows the parabolic reflective surface 8 to be parked upside-down during non-use period such as nights and storms. This could also protect the parabolic reflective surface 8 from damage and dust accumulation, thereby reducing the amount of required cleaning to maintain the parabolic reflective surface 8 at maximum reflectance. This rotation capability also allows protection during inclement weather, and can be used to facilitate maintenance or replacement of the reflector.

The present invention avoids the use of such a heat transfer system, as superheated steam can be created directly in the collector tubes. Eliminating the intermediate heat transfer step increases efficiency, and reduces capital costs over existing parabolic reflector systems. Also, eliminating the use of synthetic oil as a heat transfer fluid eliminates the temperature constraint imposed by the maximum operating range of existing heat transfer fluids. Superheated steam generated directly in the collector tubes can be in the temperature range of up to or over 500 degrees C., thereby increasing the overall efficiency of the system. The system can also be operated at high pressure, using water in a liquid state, with the water under pressure then flashed to produce steam which is further superheated in subsequent reflector assemblies. Such high pressure operation is possible as there is less concern for joint failure with the independent suspension system of the invention.

Figure 4:
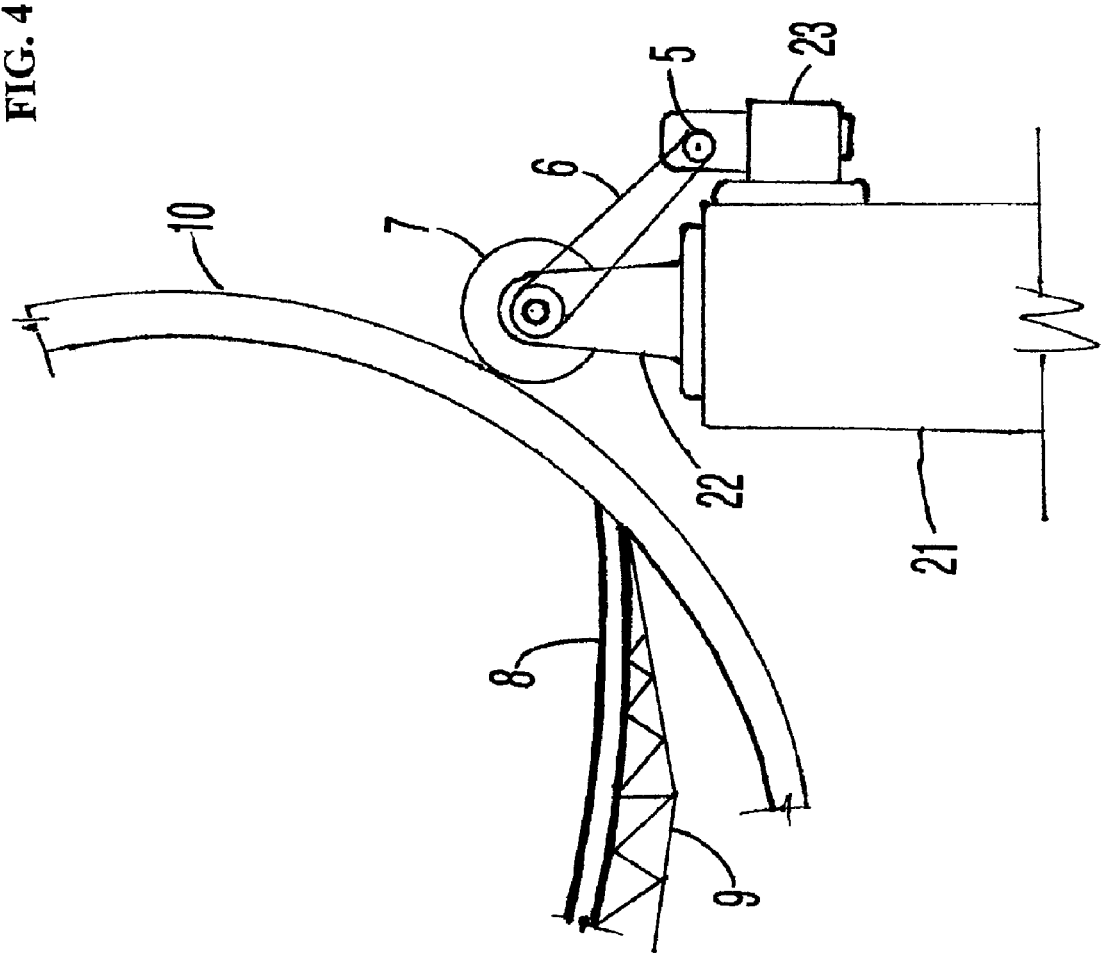
FIG. 4 is a detailed enlargement of a portion of FIG. 3, illustrating details of the tracking system which includes a drive roller, drive motor, drive chain and a servo controlled motor and focusing system.

FIG. 4 represents an enlargement of the drive system and roller support in FIG. 3. The drive chain 6 is driven by a drive gear 5 connected to a motorized tracking system 23. The motorized tracking system 23 maintains the position of the parabolic reflective surface 8 in an optimum orientation relative to the position of the sun. The circular support beam 10 is driven by the drive roller 7. Because there is a balancing of forces spread over more support rollers and drive rollers, the inventive system can use smaller motors and drivers, and can operate with less wear and tear on the drive system, to insure long term reliability. Thus, the inventive system is much simpler and more cost effective than existing systems. FIG. 4 also shows the detail of the drive roller 7 supported by a roller support arm 22 supported by a roller support column 21. Because each circular support beam 10 is supported by at least two rollers, the loads transmitted by the apparatus are spread out over a much wider area than existing systems which rotate about a single structural axis.

In a preferred embodiment of the present invention, the parabolic reflector is on the order of 15 feet in diameter, and the collector tube is designed to absorb sufficient solar radiation so that superheated steam can be generated. This may be accomplished in different stages. That is, in a first reflector/collector assembly, water can be converted to steam, the steam then fed to a second reflector/collector assembly where the steam is further heated to produce superheated steam, this then is used to drive a turbine for generating electricity. The condensate and depleted steam leaving the turbine can then be separated; the condensate returned to the first stage with make-up water for re-conversion to steam, any exhaust steam fed to the second stage for reheating to become superheated steam once again. In this way, optimum utilization of the solar radiation is achieved, with less equipment, reducing not only initial cost but improving long term reliability.

The above described system could be considered one unit of a multiple unit solar energy "farm", having a plurality of parabolic reflector assemblies. The independently supported collector tubes can be piped in many different ways, in series, in parallel, or piped to intermediate storage or other processing equipment, and so the system is quite flexible and adaptable to various commercial and industrial needs.

In another embodiment of the invention, smaller units can be prefabricated for roof mounting to provide hot water for space heating and/or cooling or for domestic water use. Since the system is simple and efficient, it is more easily adapted for integration with HVAC systems in existing homes and commercial buildings, particularly as the collector pipe is independently supported. Such a system could operate with water or a water/glycol solution to provide a thermal source for domestic hot water or for using the hot water to heat and/or cool a residence or commercial building.

In another embodiment of the invention, the parabolic trough can be substituted with a parabolic dish and this assembly made to rotate about the center point made by the perimeter of the parabolic dish. In this embodiment, a single independently supported fixed point is the location for the focus point of the parabolic dish. The focus of the parabolic dish remains fixed and independently supported while the parabolic dish rotates along two axis under it.

While the preferred embodiments of the invention have been discussed above, it will be understood by those skilled in the art that various changes or modifications could be made without departing from the scope of the invention herein involved. It is intended that all matter contained in the above description and depicted in the accompanying drawings be construed as illustrative of the present invention and not to unduly limit the scope of the invention.

The invention claimed is:

1. A parabolic trough solar energy system comprising: a rotatable parabolic trough solar reflector which is movable for tracking the sun; a fixed and independently supported energy collector tube having no direct or indirect attachment to the rotatable parabolic trough solar reflector and mounted along a focus axis of the reflector, such that the parabolic trough rotates around the collector tube, the collector tube having a length greater than or equal to a length of the parabolic reflector, a collector tube support assembly having fixed support structures disposed adjacent each end of the solar reflector, tube supporting means disposed between the fixed support structures, and means for connecting the collector tube to the tube supporting means, such that the collector tube is fixed in position and supported independently of the solar reflector.

2. The parabolic trough solar energy system of claim 1 further comprising means for moving the solar reflector relative to the collector tube so that the solar reflector tracks the sun.

3. The parabolic trough solar energy system of claim 1 further comprising at least one circular support beam for supporting the solar reflector.

4. The parabolic trough solar energy system of claim 2 further comprising at least one circular support beam connected to and supporting the solar reflector, the means for moving engaging the circular support beam for rotating the circular support beam for moving the solar reflector attached thereto.

5. The parabolic trough solar energy system of claim 2 wherein the means for moving comprise a drive motor engaged to a drive wheel, engaged to the solar reflector.

6. The parabolic trough solar energy system of claim 1 wherein the collector tube support assembly has the independently supported collector tube supported by a plurality of pipe roller hangers, each connected to a catenary suspender bar, each bar in turn supported by a collector tube support catenary which extends over the parabolic solar reflector, the catenary supported by a pair of catenary wire support towers disposed adjacent the ends of the solar reflector.

7. The parabolic trough solar energy system of claim 1 wherein a fluid is heated within the collector tube.

8. The parabolic trough solar energy system of claim 7 wherein the fluid is selected from the group consisting of water, a water/glycol mixture, steam, superheated steam, and synthetic oil.

9. The parabolic trough solar energy system of claim 1 wherein the collector tube is composed of a material suitable for operating at temperatures up to 500 degrees C.

10. A method for providing a parabolic trough solar energy system comprising: providing a rotatable parabolic trough solar reflector having means for rotating to track the sun, providing a solar energy collector tube, the collector tube having a length greater than or equal to a length of the parabolic reflector, locating the collector tube along a focus axis of the reflector, and supporting the collector tube in a fixed, non-rotational position, the collector tube being independently supported of and fixed relative to the rotatable reflector, having no direct or indirect attachment to the rotatable parabolic trough solar reflector, rotating the reflector around the collector tube, such that as the reflector moves to track the sun, the collector tube remains stationary.

11. The method of claim 10 further comprising providing at least one circular support beam connected to the parabolic trough solar collector, the means for tracking engaging the circular support beam such that the circular support beam is rotatable for 360 degrees, and, tracking the sun by rotating the circular support beam.

12. The method of claim 11 further comprising rotating the circular support beam by 180 degrees for protecting a surface of the reflector during inclement weather or for maintenance.

13. The method of claim 10 wherein the step of supporting the collector tube comprises:
   providing fixed support structures disposed adjacent each end of the solar reflector;
   providing a tube supporting apparatus disposed between the fixed support structures; and,
   connecting the collector tube to the tube supporting apparatus, fixing the collector tube in position and thereby supporting the collector tube independent of the solar reflector.

* * * * *